June 17, 1952     A. VOORHIES, JR     2,600,452
CATALYTIC IMPROVEMENT OF HYDROCARBON SYNTHESIS PRODUCT
Filed July 1, 1947
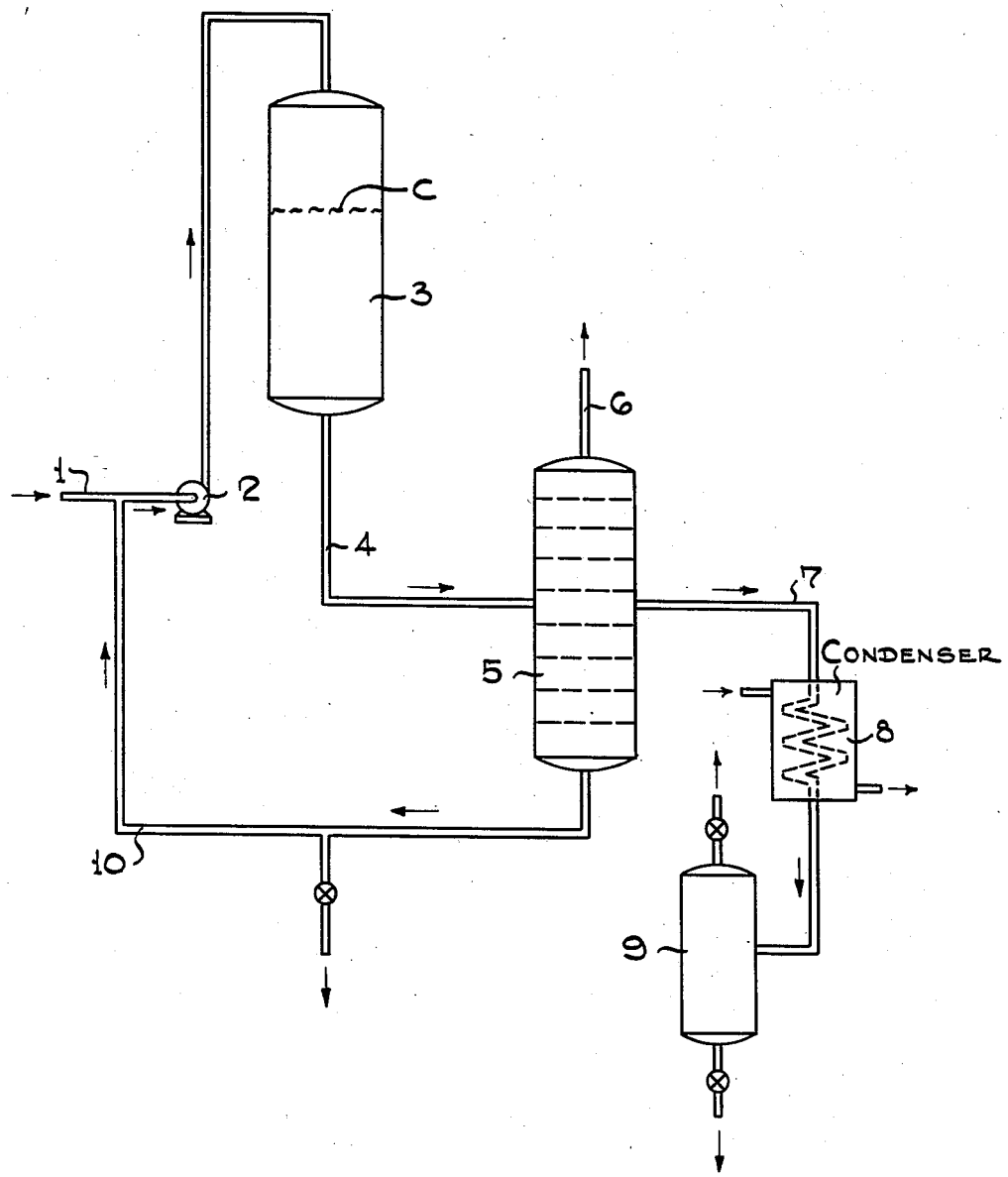
Alexis Voorhies, Jr. Inventor
By J. Cushman Attorney Patented June 17, 1952

2,600,452

UNITED STATES PATENT OFFICE 2,600,452

CATALYTIC IMPROVEMENT OF HYDROCARBON SYNTHESIS PRODUCT

Alexis Voorhies, Jr., Baton Rouge, La., assignor to Standard Oil Development Company, a corporation of Delaware Application July 1, 1947, Serial No. 758,329

8 Claims. (Cl. 260—450)

My invention relates to improvements in manufacturing synthetic gasoline and in particular it relates to improvements in the anti-detonation quality of the synthetic gasoline produced by the reduction of carbon monoxide with hydrogen.

The production of normal liquid hydrocarbons and oxygenated hydrocarbons by the reduction of the oxides of carbon with the hydrogen containing gas in the presence of a suitable catalyst is now a method of record. The first work done in this field was in the presence of cobalt catalyst and the process developed is known as the Fischer-Tropsch process. The product resulting from reacting together carbon monoxide and hydrogen in the presence of cobalt was one which had a very low octane rating since it was for the most part composed of straight chain paraffinic hydrocarbons.

The next step in this field involved substitution of an iron catalyst for the cobalt catalyst. In the process using iron somewhat higher temperatures were employed and somewhat different ratio of hydrogen to carbon monoxide feed to the reaction was employed. For example, whereas the older Fischer-Tropsch process was conducted at around 300–400° F., the process employing iron catalyst was carried out at temperatures from 500–800° F. In the Fischer-Tropsch process the ratio of hydrogen to carbon monoxide in the feed to the reaction zone was about 2 moles of hydrogen per mole of carbon monoxide. In the process employing iron generally the ratio of hydrogen to carbon monoxide in the feed of the reaction zone is often of the order of about 1 mol of hydrogen to 1 mol of carbon monoxide, but for special purposes this ratio may be varied so that the ratio of hydrogen to carbon monoxide may be from about 2 to 4 mols of hydrogen per mol of carbon monoxide. The main distinction between the two processes, however, is that the quality of the gasoline formed in the process using iron as a catalyst is better with respect to its anti-detonation qualities. It is a generally accepted belief that the gasoline product produced by reducing carbon monoxide with hydrogen in the presence of an iron catalyst is of higher quality than that produced where the catalyst is cobalt.

In spite, however, of the fact that the raw gasoline from the process employing iron is of relatively good quality, nevertheless, it is customary to treat the gasoline to improve further its quality. Thus, it has been previously proposed to treat the hydrocarbon synthesis product formed by reducing carbon monoxide with hydrogen at elevated temperatures with bauxite in order to remove oxygen and to improve the octane number characteristics of the gasoline. The improvement in the octane number characteristics of the gasoline thus obtained largely arises from isomerization reactions wherein straight chain alphaolefins are isomerized to other straight chain olefins with a shift of the double bond toward the middle of the molecule, or to a rearrangement of a straight chain olefin to form an iso-olefin.

I have found that an unexpectedly good result is obtained by treating the hydrocarbon synthesis product in the presence of a severely deactivated and plant contaminated cracking catalyst, particularly a synthetic silica alumina gel cracking catalyst. I have found that the anti-detonation quality of the gasoline is greatly improved and that the yields are high. The result is unexpected in that the cracking catalyst used is extremely depreciated in value for further use in ordinary catalytic cracking, inasmuch as its activity for gas oil cracking is low and that the carbon formation for a given gas oil conversion is high. However, when this used contaminated cracking catalyst is employed for treating a hydrocarbon synthesis product, there is no deleterious effect due to the spent and contaminated state of the catalyst. Its substantial deactivation for petroleum gas oil cracking results in an optimum state of activity for the treatment of the hydrocarbon synthesis product. In a large number of pilot plant runs, results obtained with used and deactivated normal cracking catalyst, have shown the latter to be superior to those obtained in conventional bauxite treating of the hydrocarbon synthesis product. This superiority, as indicated, resides in obtaining a high octane gasoline in good yields and with a relatively small amount of carbonaceous material formed during the treatment.

To explain what I mean by a severely deactivated catalyst, I may define the same in terms of what is known as its "D+L" value or rating. This rating is recognized in the industry as a means for determining the activity of a cracking catalyst. The test is performed by cracking a gas oil at a temperature of 850° F. in the presence of a portion of the catalyst to be tested while feeding the gas oil to the catalyst chamber at a space velocity of 0.6 volumes of oil per volume of catalyst per hour, during a two-hour period. The product is collected and subjected to an Engler distillation, the portion boiling up to and including 400° F. being collected as a distillate. The amount of material subjected to distillation is usually 100 volumes, say 100 cc. The liquid condensate or distillate is measured. The material subjected to distillation minus the sum of the undistilled material remaining in the distillation flask plus the distillate, is equal to L, or the loss. The sum of the distillate quantity (D) plus the loss (L) is taken as the activity of the catalyst; and this is commonly referred to as the D+L value. A good catalyst should have a D+L value of at least 40, and many possess a D+L value of 60. A catalyst of fair activity would have a D+L of about 30. A severely deactivated catalyst, therefore, would be one which had a D+L value of below about 20.

It should also be pointed out that during use in the commercial units the synthetic silica-alumina gel catalyst becomes contaminated with iron, and this contamination of the catalyst with iron also has a deleterious effect on the catalyst in the cracking operation and lowers its D+L value.

It is pointed out that methods are known, other than that above discussed for determining cracking catalyst activity. In fact, an experienced operator can by mere observance of the performance of a catalyst in a commercial unit, determine at least qualitatively the fact that a catalyst has lost activity. For example, the yield of gasoline product and/or the degree of carbonaceous material or coke formed, based on the feed, are indicia to him of the catalyst activity.

The object of my invention, therefore, is to improve the quality of a normally liquid product produced by reducing carbon monoxide with hydrogen in the presence of the catalyst.

Another object of my invention is to improve the anti-detonation quality of a normally liquid hydrocarbon synthesis product formed by reducing carbon monoxide by hydrogen containing gas without incurring severe loss of material or the formation of inordinately large amounts of carbonaceous materials.

Other and further objects of my invention will appear in the detailed following description.

In the accompanying drawing I have shown diagrammatically an apparatus in which a preferred modification of my invention may be carried into effect.

Referring in detail to the drawing, normally liquid hydrocarbon synthesis product produced by reducing carbon monoxide using hydrogen containing gas in the presence of a metallic iron catalyst is introduced in the present treating system through line 1 and then pumped by pump 2 in retreating vessel 3 containing a fixed mass of spent and contaminated catalyst C. This catalyst is preferably a synthetic gel containing silica and alumina and is one which has been previously used in the catalytic cracking of petroleum gas oil to the extent that it has lost activity and is therefore not usable in said last-named catalytic process. It is also generally contaminated with iron or iron compounds which have been acquired in the catalytic cracking plant by contact with iron surfaces. Either or both of these factors unfavorably reduce its activity and would render it necessary to withdraw the catalyst from the petroleum gasoline cracking process and discard it.

Under conditions which I am about to describe more fully, hereinafter, the hydrocarbon synthesis product is passed in vapor phase through the reactor or treater 3 and then withdrawn through line 4 and delivered to a fractional distillation column 5, where it is subjected to distillation. From the top of 5 a normal gaseous product is withdrawn. This normal gaseous material contains $C_3$ and $C_4$ olefins which may be sent to a polymerization plant (not shown) for the purpose of causing polymerization of said normal gaseous olefins to form polymerization products boiling in the gasoline boiling range. The main product of my present process is withdrawn from column 5 to line 7, condensed in a column 8 and collected in receiving drum 9. This material in receiving drum 9 is the gasoline fraction or cut. A small amount of heavy naphtha cut boiling in the lower gas oil range is withdrawn from tower 5 through line 10 and recycled at least in part to line 1 for further treatment.

While I have indicated by means of the flow diagram depicted in the accompanying drawing the best manner in which my process may be operated, I have omitted a number of common engineering devices such as flow control valves, temperature recording devices, etc., and this omitted accessory apparatus would normally be used in the operation in a well conducted plant. I have, however, done this in order to direct attention to my improvements and to avoid confusion with what is old.

I have made a number of pilot plant tests or runs and I set forth below data on a few of these runs in order to show the utility of my improved process. In the runs summarized below the catalyst employed is a spent and contaminated silica alumina gel cracking catalyst withdrawn from a commercial catalytic cracking plant. Due to preceding use this catalyst had a very low activity (D+L of about 20) from the standpoint of its capability of promoting the cracking of natural or petroleum gas oil and was found to be uneconomical for use in catalytic cracking operations due to the fact that it had become contaminated during use in the catalytic cracking plant with harmful material such as iron and its compounds.

The conditions and results of the tests or runs which I made I set forth below in tabular form. The feed charged through to the treating vessel in the drawing was a normal liquid hydrocarbon synthesis product formed in the presence of an iron catalyst. The material had an end boiling point of about 600° F. with about 75% of the material boiling in the gasoline boiling range. The tests were made in a fixed bed unit.

| Runs | Feed to Catalytic Unit | I | II | III | IV |
|---|---|---|---|---|---|
| Temp. Catalyst (Top)° F | | 914 | 920 | 898 | 953 |
| Temp. Catalyst (Middle)° F | | 918 | 904 | 899 | 949 |
| Temp. Catalyst (Bottom)° F | | 854 | 866 | 903 | 950 |
| Temp. Catalyst (Average)° F | | 895 | 897 | 900 | 951 |
| Temp. Lead Bath, °F | | 956 | 950 | 915 | 953 |
| Wt. Per cent Water, Based on Feed | | 0 | 0 | 0 | 0 |
| Reactor Pressure, Lb./Sq. In. Gage | | 0 | 0 | 0 | 0 |
| Cracking Period, Min | | 60 | 60 | 60 | 60 |
| Oil Feed Rate (a. v.) V/V/Hr | | 0.5 | 1.0 | 3.0 | 2.0 |
| Yield Data, Based on Feed: | | | | | |
| Material Balance, Weight Per cent | | 96.0 | 95.0 | 101.9 | 100.3 |
| 10 Lb. Gasoline, Vol. Per cent | | 58.2 | 63.8 | 86.6 | 66.0 |
| $C_5$–430° F., Vol. Per cent | 75.3 | 54.8 | 60.2 | 76.5 | 62.0 |
| Total $C_4$, Vol. Per cent | 0.0 | 20.8 | 19.5 | 5.0 | 18.1 |
| Isobutylene, Vol. Per cent | | 6.0 | 6.4 | 1.9 | 6.6 |
| N-butylene, Vol. Per cent | | 8.1 | 9.0 | 2.3 | 8.6 |
| Isobutylene, Vol. Per cent | | 5.4 | 3.8 | 0.6 | 2.4 |
| N-butane, Vol. Per cent | | 1.3 | 0.4 | 0.2 | 0.5 |
| Dry, Gas, Weight Per cent | 0.0 | 15.0 | 11.6 | 3.0 | 9.3 |
| Cu. Ft./Bbl | | 528 | 377 | 99 | 285 |
| Hydrogen, Weight Per cent | | 0.14 | 0.10 | 0.03 | 0.05 |
| Methane, Weight Per cent | | 1.52 | 0.80 | 0.17 | 0.60 |
| Ethylene, Weight Per cent | | 1.10 | 0.70 | 0.16 | 0.48 |
| Ethane, Weight Per cent | | 1.10 | 0.80 | 0.19 | 0.60 |
| Propylene, Vol. Per cent | | 13.8 | 12.0 | 3.3 | 10.1 |
| Propane, Vol. Per cent | | 2.7 | 1.65 | 0.4 | 1.2 |
| Carbon, Weight Per cent | | 4.7 | 2.8 | 1.1 | 1.9 |
| Gas Oil, Vol. Per cent | 24.7 | 9.4 | 11.9 | 15.9 | 15.2 |
| 10 Lb. Gasoline Inspection: | | | | | |
| Gravity, ° API | | 63.5 | 64.3 | 65.2 | 63.1 |
| Per cent D+L at 158° F | | 25.5 | 28.5 | 18.0 | 26.0 |
| Per cent D+L at 212° F | | 56.0 | 57.0 | 44.5 | 56.0 |
| Per cent D+L at 257° F | | 68.5 | 71.0 | 64.5 | 70.5 |
| ASTM Octane | 66.4 | 79.3 | 79.9 | 79.5 | 80.7 |
| CFR-Res. Octane | 71.3 | 89.7 | 90.3 | 90.8 | 92.2 |
| CFR-Res. Oct.+1.5 cc. TEL | 82.6 | 94.6 | 96.7 (+2.0) | | 96.9 (+2.0) |

In the foregoing data it is significant to note that in run No. III a very high yield of gasoline is obtained namely 86.6 volume per cent. It is also pointed out that in run No. III an ASTM octane number of 79.5 gasoline product was formed from the material forming the feed having an octane number of 66.4. On the CFR research octane basis this corresponds to an increase of from 71.3 for the gasoline fraction of the feed stock to 90.8 for the product gasoline. It is also important to note in connection with run III that only 1.1 weight per cent of the feed material was converted to carbonaceous material. It is also apparent from the data that for best results the contact time should be relatively low. For example, where the feed rate was 0.5 volumes of oil per volume of catalyst per hour the carbon formation was 4.7 weight per cent. Where the feed rate of oil was one volume of oil per volume of catalyst per hour the carbon formation was 2.82 weight per cent. In run IV the feed rate was 2 volumes of oil per volume of catalyst per hour and here the yield of 10 lbs. gasoline was higher than in runs I and II, the coke formation was lower and the octane improvement was excellent. The temperature here was about 950° F.

It is quite apparent from the data that the feed rate of the fresh material from the reactants must be of the order of 2 to 3 volumes of cold oil per volume of catalyst per hour. Somewhat higher feed rates may be used, say up to 5 volumes of oil per volume of catalyst per hour where the temperature is increased up to 950 to 975° F. Another significant factor revealed by the data is that in the case of runs III and IV substantial cuts of normal gaseous olefins are formed. This olefinic material may be polymerized to form normal liquid hydrocarbons boiling in the gasoline range thus increasing the yield of the overall gasoline product.

Since, as previously stated, it is a known procedure to subject the synthetic gasoline produced by the reduction of carbon monoxide with hydrogen to an after treatment with bauxite for the purpose of improving the octane quality of the gasoline and otherwise upgrading the material, I have made some comparative tests in a fluid catalyst unit in which a comparison was made between a severely deactivated silica alumina gel cracking catalyst on the one hand, and bauxite on the other. The feed in both of these runs was a synthetic gasoline product which contained from 83 to 84 volume per cent of a $C_5$–430° F. end boiling point fraction mixed with 12.5 to 14 volume per cent of gas oil. The conditions under which the tests were made, as well as the yields, are set forth below:

| Silica-Alumina Gel Catalyst [1] | Feed Stock | Spent Catalyst | Bauxite |
|---|---|---|---|
| D+L Activity | | 22 | 13 |
| Temperature, °F | | 816 | 850 |
| Catalyst/Oil Ratio | | 9 | 2.5 |
| W/Hour/W [2] | | 12 | 12 |
| Weight Per Cent Steam on Feed | | 26 | 23 |
| Reactor Pressure, p. s. i. g. (top) | | 9 | 9 |
| Reactor Feed, volume Per Cent of Total Feed | | 95.3 | 93.9 |
| Yields (Output Basis) [3] | | | |
| 10 lb. Gasoline, Vol. Per Cent | 87.7 | 83.2 | 81.0 |
| Gravity, °API | | 64.2 | 64.0 |
| Per Cent D+L at 158° F | 25.5 | 29.0 | 20.5 |
| Per Cent D+L at 212° F | 48.5 | 55.5 | 48.5 |
| Per Cent D+L at 257° F | 64.5 | 71.0 | 66.0 |
| Motor Octane No | 68.6 | 81.1 | 77.2 |
| Research Octane No | 80.0 | 94.1 | 88.0 |
| Res. Oct. No. + 2 cc. TEL | 82.0 | 99.1 | 96.8 |
| $C_5$–430° F. VT, vol. Per Cent | 80.1 | 75.5 | 72.0 |
| Total $C_4$, vol. Per Cent | 3.0 | 7.1 | 5.5 |
| Isobutylene, vol. Per Cent | 2.6 | 1.6 | 0.8 |
| n-butenes, vol. Per Cent | 2.6 | 4.7 | 4.0 |
| Isobutane, vol. Per Cent | | 0.3 | 0.1 |
| n-butane, vol. Per Cent | 0.4 | 0.5 | 0.6 |
| Dry gas, Weight Per Cent CF./bbl | 0.2 | 2.9 77 | 2.0 60 |
| Gas Oil Bottoms, vol. Per Cent | 16.7 | 8.9 | 11.5 |
| Carbon, weight Per Cent | | 1.6 | 3.0 |

[1] Containing 12–14% alumina, the remainder being silica gel.
[2] In normal cracking the feed rate of oil is such that from about 1 3 pounds of cold oil per pound of catalyst in the reactor, are fed each hour into said reactor. Here it was 12 pounds of oil per lb. of catalyst in the reactor per hour.
[3] Based on actual flashed feed to the reactor.

It will be noted from the foregoing table that the cracking catalyst having a D+L activity of 22 yielded 83.2 volume per cent of 10-pound (Reid Vapor Pressure) gasoline as against 81 volume per cent 10-pound gasoline where bauxite was used. It will be noted further that both the clear octane rating and the rating of the leaded gasoline (TEL=tetra-ethyl lead) were superior in the run made using the spent cracking catalyst, and it is also significant to note that the carbon formation in the case of the spent catalyst was approximately 50% of that formed in the run using bauxite. It is particularly interesting to note that the research octane number (clear) was about 6 numbers better in the run using the spent catalyst than in the run employing bauxite, for this is a very important difference in this high octane range. And with 2 cc. of tetra-ethyl lead per gallon, the research octane rating of the gasoline produced in the presence of the spent catalyst is increased to over 99.

As indicated, the treatment with spent cracking catalyst results in the formation of olefins and a shifting of the double bond in the olefin toward the center of the molecule. Infra-red analyses of the $C_7$ fraction gave the results below:

*Infrared analyses of $C_7$ fractions*

|  | Feed | Product | |
|---|---|---|---|
| Synthesis Run, Treating Run | | Run 1 | Run 2 |
| Catalyst | | (¹) | (¹) |
| Temperature, °F | | 900 | 950 |
| v./v./Hr | | 3 | 10 |
| Pressure, p. s. i. g | | 0 | 0 |
| Res. O. N. ($C_5$–430° F.) | 75.9 | 91.0 | 87.8 |
| Olefin Type, weight percent: | | | |
| Alpha | 54.4 | 4.7 | 16.5 |
| Trans | 3.3 | 21.1 | 25.3 |
| Cis | 4.3 | 4.7 | 9.3 |
| Tertiary | 4.4 | 6.8 | 6.0 |
| Tri-Subst. Ethylene | 2.1 | 6.9 | 3.1 |
| Tetra-Subst. Ethylene | | 33.6 | 13.9 |
| Weight percent Oxygen: | | | |
| Alcohols | 0.82 | 0.24 | 0.06 |
| Acids | 1.41 | 0.11 | 0.36 |
| Esters | 0.60 | 0.0 | 0.05 |
| Aldehydes | 0.86 | 0.34 | 0.34 |
| Ketones | 0.34 | 0.32 | 0.77 |
| Total | 4.03 | 1.01 | 1.58 |

¹ Spent synthetic silica-alumina.

The olefins as synthesized are predominantly of the alpha type, with the olefinic double bond adjacent to a terminal carbon atom. After treatment with used cracking catalyst the predominant olefin types are first tetra-substituted ethylenes and second trans-olefins. Olefin isomerization occurs to an extent roughly proportional to the severity of the treatment, as indicated by the partial conversion effected in the high throughput run 2.

Now while I have described in detail the process of my treating hydrocarbon synthesis product I wish to point out that I may mix the hydrocarbon synthesis product with a virgin or cracked petroleum gas oil and obtain a high quality cracked or treated product in good yields with low carbon formation. The amount of virgin or petroleum gas oil should not, however, predominate at the mixture.

In the accompanying drawing and the words which describe its operation in the process, the catalyst is in the form of a fixed bed. Some of the runs, however, as previously stated, were made in a fluid catalyst type of reactor. Since this technique is now known, it is deemed unnecessary to describe it in detail. It will be sufficient to point out that, as usual, the catalyst is in the form of a powder having a particle size of from 20 to 200 microns, with the major portion having a particle size above 40 microns, and that the hydrocarbon in vapor form is passed upwardly through the treater containing the powdered catalyst at a sufficiently low velocity to form a sort of bubbling bed or dense, turbulent suspension which has come to be known as a fluidized catalyst bed. It might be added that the superficial gas velocities in fluid beds are of the order of ½ to 3 or 4 feet per second. And by "superficial velocity", I mean the velocity considered as though the reactor contained no catalyst.

To recapitulate briefly, my present invention relates to improvement in the art of catalytic treating of synthetic normally liquid naphtha hydrocarbons, usually containing oxygenated compounds associated therein, which are the product formed by reducing carbon monoxide with hydrogen in the presence of an iron catalyst, usually a catalyst containing a very small per cent of a promoter such as potassium carbonate. I have found that I may produce by this catalytic treatment high yields of high octane number gasoline provided the treatment is carried out in the presence of a spent and contaminated synthetic gel cracking catalyst. As compared with the prior acknowledged art of bauxite treatment of the same or a similar product, I obtained a gasoline having a higher anti-detonation rating or octane number by practicing my process.

Instead of using a spent silica alumina gel catalyst, I may use a silica-magnesia spent catalyst (30–40 weight per cent magnesia gel, remainder silica gel) or a spent bentonitic clay cracking catalyst.

Also the catalyst in reactor 3 may be powdered and formed into a fluidized bed by causing the oil vapors to flow upwardly in said reactor at a superfical velocity of from about ½ to 2 feet per second. The fluidized catalyst technique is now well understood in the petroleum oil industry.

In the claims when speaking of a "high feed rate", I mean a feed rate of about 3 to 5 volumes of cold oil per volume of catalyst per hour in the case of a fixed bed of catalyst; and, in the case of a fluidized bed of catalyst, I mean say 10 to 15 pounds of oil feed per pound of catalyst in the reactor, per hour.

Some modifications suggested by those familiar with the art can be added without departing from the spirit thereof.

I claim:

1. The method of improving the quality of a synthetic normally liquid hydrocarbon product formed by reacting carbon monoxide and hydrogen in the presence of a synthesis catalyst, the major portion of which boils in the gasoline boiling range and contains oxygenated compounds and large amounts of alpha olefins which comprises subjecting the said product in a reaction zone to the influence of heat in the presence of a spent and contaminated cracking catalyst containing silica and alumina that has become deactivated in the cracking of liquid hydrocarbons so that it has a D+L value of not substantially above 20 during a relatively short contact time corresponding to a space velocity of approximately 2–5 volumes of cold oil per volume of catalyst calculated on a fixed bed basis at temperatures of from about 800° F. to about 975° F., the space velocity being the higher the higher the temperature within the range specified, and vice versa.

2. The method as set forth in claim 1 in which the spent cracking catalyst contains silica and alumina in the ratio of about 86-88 parts by weight of silica and 14-12 parts by weight alumina.

3. The method as defined in claim 1 in which the spent cracking catalyst contains iron material to the extent of about 0.3 to 1.0% by weight.

4. The method of improving the quality of a synthetic, normally liquid hydrocarbon product formed by reacting carbon monoxide and hydrogen in the presence of a synthesis catalyst, the major portion of which boils in the gasoline boiling range and contains oxygenated compounds and large amounts of alpha olefins which comprises subjecting the said product in a reaction zone to the influence of heat and a fluidized bed of powdered, spent and contaminated cracking catalyst containing silica and alumina that has become deactivated in the cracking of liquid hydrocarbons so that it has a D+L value of not substantially above 20 during a relatively short contact time corresponding to a feed rate of approximately 10 to 15 lbs. of oil feed per pound of catalyst in the reactor per hour at a temperature of from about 800° F. to about 975° F., the feed rate being the higher the higher the temperature within the range specified and vice versa.

5. The method as set forth in claim 4 in which the spent cracking catalyst contains silica and alumina in the ratio of about 86-88 parts by weight of silica and 14-12 parts by weight of alumina.

6. The method as defined in claim 4 in which the spent cracking catalyst contains iron material to the extent of about 0.3 to 1.0% by weight.

7. The method of improving the quality of a synthetic, normally liquid hydrocarbon product formed by reacting carbon monoxide and hydrogen in the presence of a synthesis catalyst, the major portion of which boils in the gasoline boiling range and contains oxygenated compounds and large amounts of alpha olefins which comprises subjecting said product in a reaction zone to the influence of heat in the presence of a spent and contaminated cracking catalyst consisting essentially of about 88 to 86 parts by weight of silica gel and 12 to 14 parts by weight of alumina and about 0.3 to 1.0 parts by weight of iron material which has become deactivated in the cracking of liquid hydrocarbons so that it has a D+L value of not substantially above 20 during a relatively short contact time corresponding to a space velocity of from about 3 to about 5 volumes of cold oil per volume of catalyst per hour, calculated on a fixed bed basis at a temperature of from about 900°-950° F.

8. The method as defined in claim 7 in which said synthetic hydrocarbon product has an end boiling point of about 600° F. and contains about 75 volume per cent of hydrocarbons boiling within the gasoline boiling range.

ALEXIS VOORHIES, Jr.

REFERENCES CITED

The following references are of record in the file of this patent:

UNITED STATES PATENTS

| Number | Name | Date |
|---|---|---|
| 2,264,427 | Asbury | Dec. 2, 1941 |
| 2,345,128 | Korpi | Mar. 28, 1944 |
| 2,347,682 | Gunness | May 2, 1944 |
| 2,357,136 | Rubin | Aug. 29, 1944 |
| 2,360,463 | Arveson | Oct. 17, 1944 |
| 2,360,787 | Murphree et al. | Oct. 17, 1944 |
| 2,488,032 | Johnson | Nov. 15, 1949 |